United States Patent
Shibata et al.

(10) Patent No.: US 6,811,200 B2
(45) Date of Patent: Nov. 2, 2004

(54) SEAT DEVICE FOR VEHICLE (75) Inventors: Keeichirou Shibata, Aki-gun (JP); Kouji Nakao, Aki-gun (JP); Kenji Satani, Aki-gun (JP); Masahiko Hondou, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/774,433

(22) Filed: Feb. 10, 2004

(65) Prior Publication Data
US 2004/0160080 A1 Aug. 19, 2004

(30) Foreign Application Priority Data
Feb. 19, 2003 (JP) .................................... 2003-040570

(51) Int. Cl.⁷ ................................................ B60N 2/14
(52) U.S. Cl. .................. 296/64; 296/65.09; 296/69; 296/37.15; 297/236
(58) Field of Search ................ 296/64, 65.03, 296/65.09, 65.05, 65.16, 69, 1.09, 37.15; 297/236

(56) References Cited
U.S. PATENT DOCUMENTS

| | | | | |
|---|---|---|---|---|
| 808,679 A | * | 1/1906 | Pickles ........................ | 297/236 |
| 819,537 A | * | 5/1906 | Curwn ........................ | 238/194 |
| 1,643,236 A | * | 9/1927 | Bell ............................ | 297/236 |
| 6,629,729 B2 | * | 10/2003 | Wiedeman et al. ......... | 297/232 |
| 2003/0047957 A1 | * | 3/2003 | Bargiel ..................... | 296/65.05 |

FOREIGN PATENT DOCUMENTS

| | | |
|---|---|---|
| JP | 2000-085417 | 3/2000 |
| JP | 2001-047910 | 2/2001 |

* cited by examiner

*Primary Examiner*—Jason Morrow
(74) *Attorney, Agent, or Firm*—Nixon Peabody LLP; Donald R. Studebaker (57) ABSTRACT

A seat cushion comprises a cushion body portion including a storage recess and a cushion bottom portion covering the storage recess so as to selectively open or close it. A supplementary seat comprises a supplementary seat back which is pivotally supported so as to rotate in the longitudinal direction and a supplementary seat cushion formed separately from the supplementary seat back. The supplementary seat cushion is configured so as to selectively take a sitting position, where it is located at the side of the seat cushion, and a stored position, where it is stored in the storage recess.

Accordingly, since only the supplementary seat cushion is stored in the storage recess, the deterioration of comfortable ride caused by the high-sitting point can be suppressed. Also, the supplementary seat back can be used as a armrest or the like.

7 Claims, 9 Drawing Sheets

SEAT DEVICE FOR VEHICLE

BACKGROUND OF THE INVENTION

The present invention relates to a seat device for a vehicle, and more particularly to a seat device which is equipped with a supplementary seat at a side of vehicle seat.

Conventionally, a supplementary seat, which is configured so as to be stored in somewhere in a vehicle compartment, is used for the purpose of compatibility of providing a roomy space for few passengers and an enough sitting space for crowded passengers.

For example, Japanese Patent Laid-Open Publication No. 2002-225603 discloses a seat device comprising a seat which includes a seat cushion and a seat back and a supplementary seat which is disposed at a side of the seat and includes a supplementary seat cushion and a supplementary seat back, in which the seat cushion includes a storage box with an upward opening and a cushion covering the opening. Herein, this seat device is configured such that in the event that the supplementary seat is not used, the cushion of the seat cushion is rotated forward to open the storage box and the supplementary seat back is folded on the supplementary seat cushion, and then the folded supplementary seat is swung toward the storage box and stored in it.

Herein, the above-described prior art has the following problem.

Namely, the seat back and the seat cushion of the supplementary seat are integral with each other. Therefore, a whole of the supplementary seat along with the seat back and the seat cushion thereof needs to be stored in the storage box.

Accordingly, since a depth of the storage box needs to be enough deep to store the whole supplementary seat, this device may require a high sitting point of the seat and thereby may deteriorate a comfortable ride.

Meanwhile, in general, arranging a table and an armrest disposed at a side of the seat desirable for passengers from an utility stand point.

Herein, in the seat device with the supplementary seat disposed at the side of the like the above-described prior art, it is necessary to provide enough space at the side of the seat for the supplementary seat. However, additional members, such as the table and the armrest, may require more space in a width direction of the vehicle, resulting in a poor space utility in a vehicle compartment.

SUMMARY OF THE INVENTION

The present invention has been devised in view of the above-described problem, and an object of the present invention is to provide a seat device for a vehicle with a supplementary seat, which enables a storage of the supplementary seat without deterioration a comfortable ride of a seat storing the supplementary seat in it and can provide any other usage of the supplementary seat.

In order to achieve the above-described object, the first aspect of the present invention provides a seat device for a vehicle, comprising a seat including a seat cushion and seat back, and a supplementary seat disposed at a side of the seat, wherein the seat cushion of the seat comprises a cushion body portion that includes a storage recess with an upward opening and a cushion bottom portion that covers the opening of the storage recess so as to selectively open or close the opening, the supplementary seat comprises a supplementary seat back, of which an upper end portion is detachably supported on a side portion of the seat and a lower end portion is pivotally supported on the side portion of the seat as to allow the supplementary seat back to rotate in a longitudinal direction of the vehicle, and a supplementary seat cushion which is formed separately from the supplementary seat back and disposed below the supplementary seat back and at a side of the seat cushion of the seat, and the supplementary seat cushion of the supplementary seat is configured so as to selectively take a sitting position, where the supplementary seat cushion is located at the side of the seat cushion of the seat, and a stored position, where the supplementary seat cushion is stored in the storage recess of the seat cushion body portion of the seat.

According to the seat device of the first aspect of the invention, since the supplementary seat cushion and the supplementary seat back are formed separately from each other and only the supplementary seat cushion is stored in the storage recess, the depth (height) of the storage recess can be decreased as much as possible. As a result, this can suppress the deterioration of comfortable ride caused by the high-sitting point arrangement of the seat storing the supplementary seat.

Further, since the supplementary seat back is configured such that its upper end portion is detachably supported and its lower end portion is pivotally supported so as to allow the supplementary seat back to rotate in the longitudinal direction of the vehicle, it can be rotated forward to provide its substantially horizontal position which functions as a table or an armrest. As a result, this can improve utility of the seat device without providing additional members.

The second aspect of the present invention provides the seat device for a vehicle of the first aspect of the invention, wherein the seat cushion of the seat includes a swing mechanism for pivoting the supplementary seat cushion of the supplementary seat so as to allow the supplementary seat cushion to swing substantially in a width direction of the vehicle.

According to the seat device of the second aspect of the invention, since the seat cushion includes the above-described swing mechanism, this seat device can store easily the supplementary seat cushion in the storage recess of the seat which is disposed at the side of the supplementary seat cushion.

The third aspect of the present invention provides the seat device for a vehicle of the first aspect of the invention, wherein the supplementary seat back of the supplementary seat includes a rotational mechanism for rotating the supplementary seat back from its sitting position to allow the supplementary seat back to take at least a first rotational position, where the supplementary seat back is rotated in a width direction of the vehicle and a back face of the supplementary seat back faces substantially toward the width direction of the vehicle, and a second rotational position, where the supplementary seat back is rotated forward from the first rotational position and a side face of the supplementary seat back faces substantially upward.

Herein, in the event that the supplementary seat back is used as an armrest, just rotating the supplementary seat back forward may not provide an appropriate position of the supplementary seat back. Because, the back face of the rotated supplementary seat back, which now constitutes an upward-rest surface of the armrest, would be located at a relatively lower position in a vertical direction of the vehicle, and this lower position of the back face, i.e., upward-rest surface of the armrest, may not necessarily provide the best position of the armrest (supplementary seat back). (Because generally the supplementary seat back is configured in a shape that its width is longer that its thickness.)

According to the seat device of the third aspect of the invention, since the supplementary seat back includes the above-described rotational mechanism, the supplementary seat back is rotated in the width direction of the vehicle and then forward, in the event that it is not used as the seat. The side face of the supplementary seat back rotated in the above-described way is rotated accordingly so as to constitute an upward-rest surface of an armrest, and thereby this can provide a higher position of the armrest substantially. As a result, the supplementary seat back can be used as an armrest appropriately, thereby improving the utility of the seat device.

The fourth aspect of the present invention provides the seat device for a vehicle of the first aspect of the invention, wherein the seat includes two seats disposed separately in a width direction of the vehicle, the supplementary seat is disposed between the two seats, and the supplementary seat back of the supplementary seat includes a rotational mechanism for rotating the supplementary seat back from its sitting position to allow the supplementary seat back to take at least a position where the supplementary seat back is rotated in a width direction of the vehicle and a back face of the supplementary seat back faces substantially toward the width direction of the vehicle.

According to the seat device of the fourth aspect of the invention, a simple operation that only the supplementary seat cushion of the supplementary seat disposed between the two seats is stored in the storage recess and the supplementary seat back is rotated in the width direction of the vehicle to be folded can provide a walk-through space disposed between the two seats easily.

The fifth aspect of the present invention provides a seat device for a vehicle comprising a row of seats including two seats that are disposed separately in a width direction of the vehicle and include each seat cushion and seat back, the seat cushion of at least one of the seats comprising a cushion body portion that includes a storage recess with an upward opening and a cushion bottom portion that covers the opening of the storage recess so as to selectively open or close the opening, a supplementary seat disposed between the two seats and including a supplementary seat back and a supplementary seat cushion that are formed separately from each other, an upper end portion of the supplementary seat back being detachably supported on a side portion of the seat back of the above one of the seats and a lower end portion thereof being pivotally supported on the side portion of the seat back of the above one of the seats so as to allow the supplementary seat back to rotate in a longitudinal direction of the vehicle, the supplementary seat cushion disposed below the supplementary seat back and at a side of the seat cushion of the above one of the seats, and a swing mechanism for pivoting the supplementary seat cushion of the supplementary seat so as to allow the supplementary seat cushion to swing substantially in the width direction of the vehicle, the swing mechanism allowing the supplementary seat cushion of the supplementary seat to selectively take a sitting position, where the supplementary seat cushion is located at the side of the seat cushion of the above one of the seats, and a stored position, where the supplementary seat cushion is stored in the storage recess of the seat cushion body portion of the above one of the seats.

According to the seat device of the fifth aspect of the invention, the seat device provides substantially the same functions and effects as the seat device which is comprised of combination of the above-described first, second and fourth aspects of the invention.

The sixth aspect of the present invention comprises a rotational mechanism which is the same as the above-described third aspect of the invention, and therefore provides the same functions and effects as that.

The seventh aspect of the present invention provides the seat device for a vehicle of the sixth aspect of the invention, wherein the supplementary seat cushion and the supplementary seat back are respectively changed in their positions by the swing mechanism and the rotational mechanism such that the seat device provides at least a use mode where the supplementary seat functions as a seat, a walk-through mode where the supplementary seat cushion is stored in the storage recess and the supplementary seat back takes the first rotational position, and an armrest mode where at least the supplementary seat back takes the second rotational position.

According to the seat device of the seventh aspect of the invention, the seat device providing the above-described three modes can be easily obtained.

BRIEF DESCRIPTION OF THE DRAWINGS

Other features, aspects, and advantages of the present invention will be apparent from the following description of the present invention which refers to the accompanying drawings.

DETAILED DESCRIPTION OF THE INVENTION

Hereinafter, a seat device for a vehicle according to a preferred embodiment of the present invention will be described with reference to the accompanying drawings.

Figure 1:
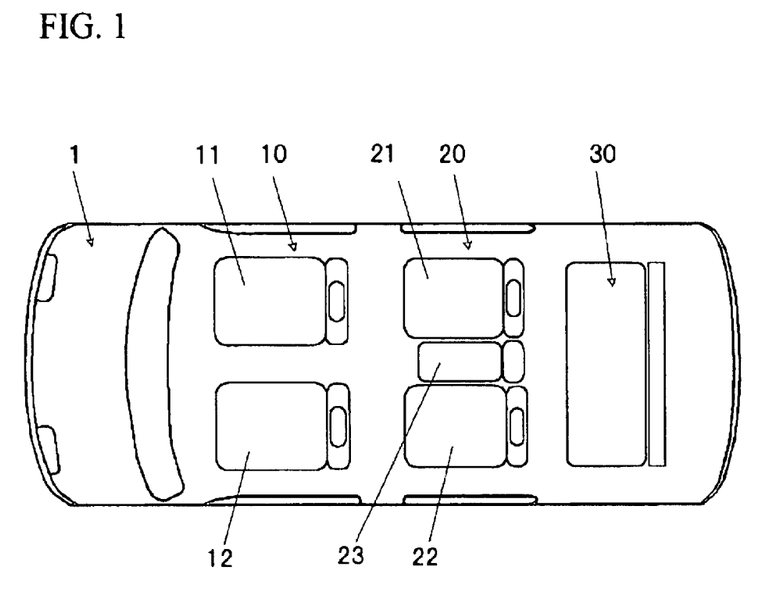
FIG. 1 is a plan view of a vehicle for showing a seat arrangement according to a first embodiment of the present invention.

FIG. 1 is a plan view of a vehicle for showing a seat arrangement according to the first embodiment.

In a vehicle 1, there are provided a first-row seat 10 disposed at the front of the vehicle, a second-row seat 20 disposed behind the first-row seat 10, and a third-row seat 30 disposed behind the second-row seat 20.

The first-row seat 10 is comprised of a driver seat 11 and a passenger seat 12. The second-row seat 20 is comprised of a right-side second seat 21 disposed behind the driver seat 11, a left-side second seat 22 disposed behind the passenger seat 12, and a supplementary seat 23 disposed between the both second seats 21, 22. The third-row seat 30 is comprised of a bench seat on which two or three of passengers can sit.

Next, the second seat 20 including the supplementary seat 23 will be described referring to FIG. 2.

Figure 2:
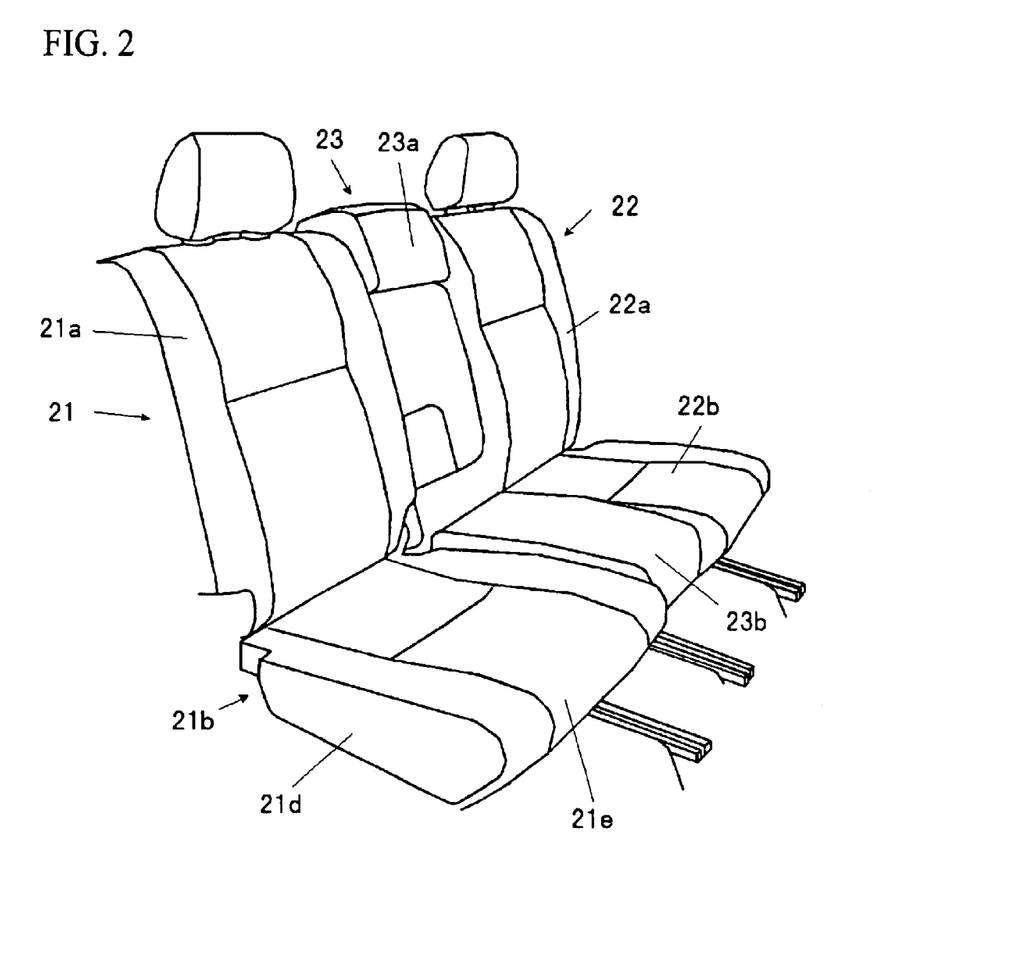
FIG. 2 is a perspective view of a second-row seat according to the first embodiment, when viewed from the right side of the vehicle.

FIG. 2 is a perspective view of the second-row seat 20, when viewed from the right side of the vehicle. The right-side second seat 21 and the left-side second seat 22 are respectively comprised of their seat backs 21a, 22a and seat cushions 21b, 22b.

Further, the seat cushion 21b of the right-side second seat 21 comprises a cushion body portion 21d including a storage recess 21c (not shown in FIG. 2) with an upward opening and a cushion bottom portion 21e covering the opening of the storage recess 21c so as to selectively open or close the opening and enable a passenger to sit thereon.

Further, the supplementary seat 23 is comprised of a supplementary seat back 23a and a supplementary seat cushion 23b which is formed separately from the supplementary seat back 23a.

The supplementary seat back 23a is configured such that its upper end portion is detachably supported on a side portion of the seat back 21a of the right-side second seat 21 and its lower end portion is pivotally supported on a side portion of the right-side second seat 21, which will be described more below.

Meanwhile, the supplementary seat cushion 23b is configured so as to selectively take a sitting position, where it is located at the side of the seat cushion 21a of the right-side second seat 21, and a stored position, where it is stored in the above-described storage recess 21c, which will be described more below.

Next, storage of the supplementary seat cushion 23b in the storage recess 21c will be described referring to FIGS. 3 through 6.

Figure 3:
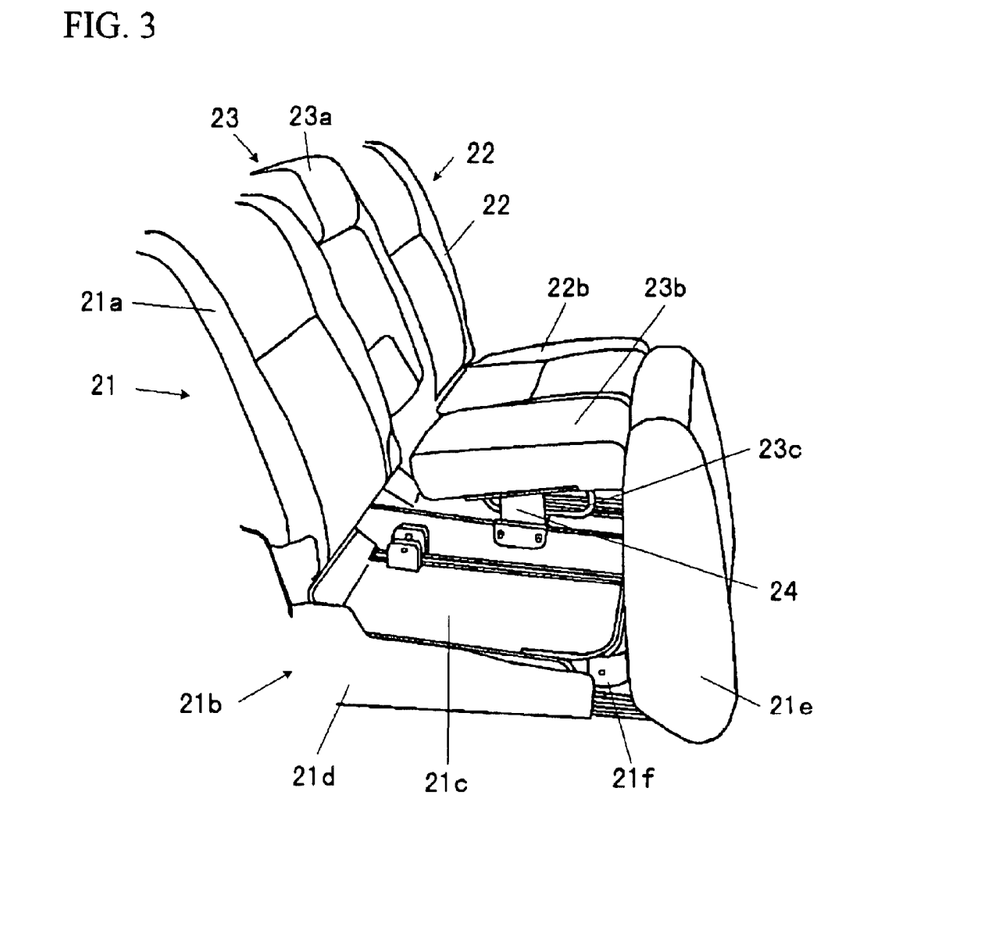
FIG. 3 is a perspective view of the second-row seat according to the first embodiment in which a rear end of a cushion bottom portion is rotated upward, when viewed from the right side of the vehicle.
Figure 4:
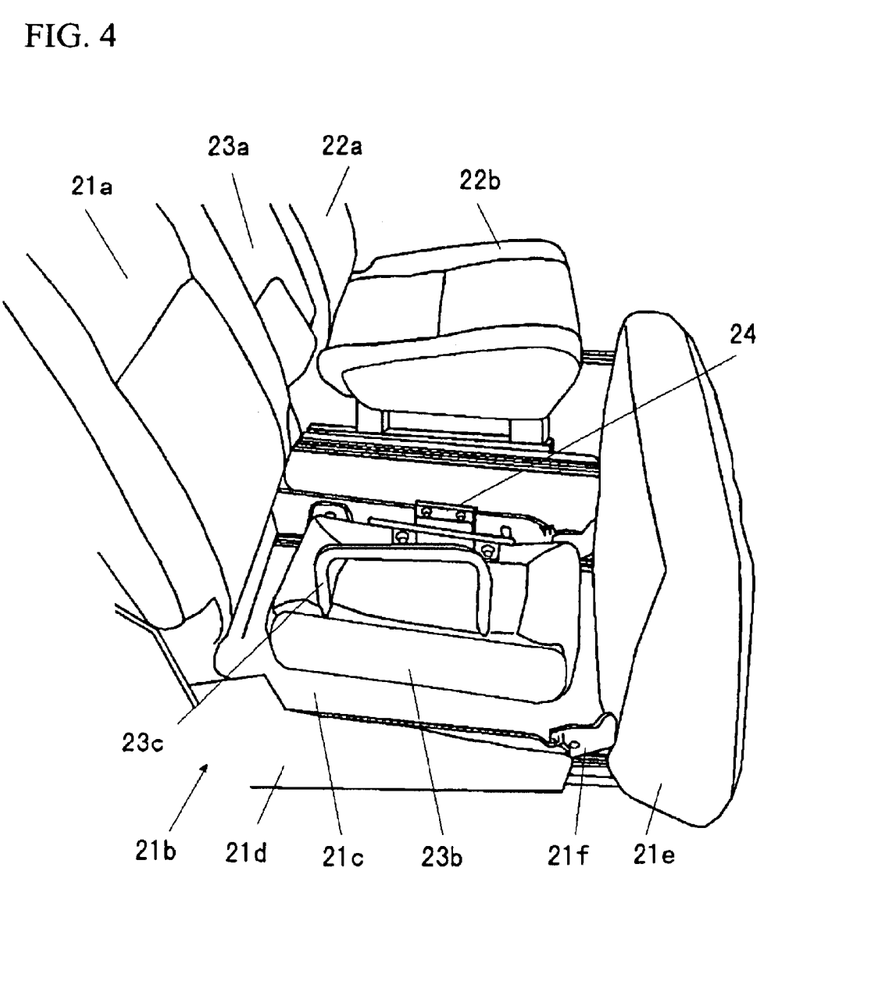
FIG. 4 is a perspective view of the second-row seat according to the first embodiment in which a supplementary seat cushion is stored in a storage recess, when viewed from the right side of the vehicle.
Figure 5:
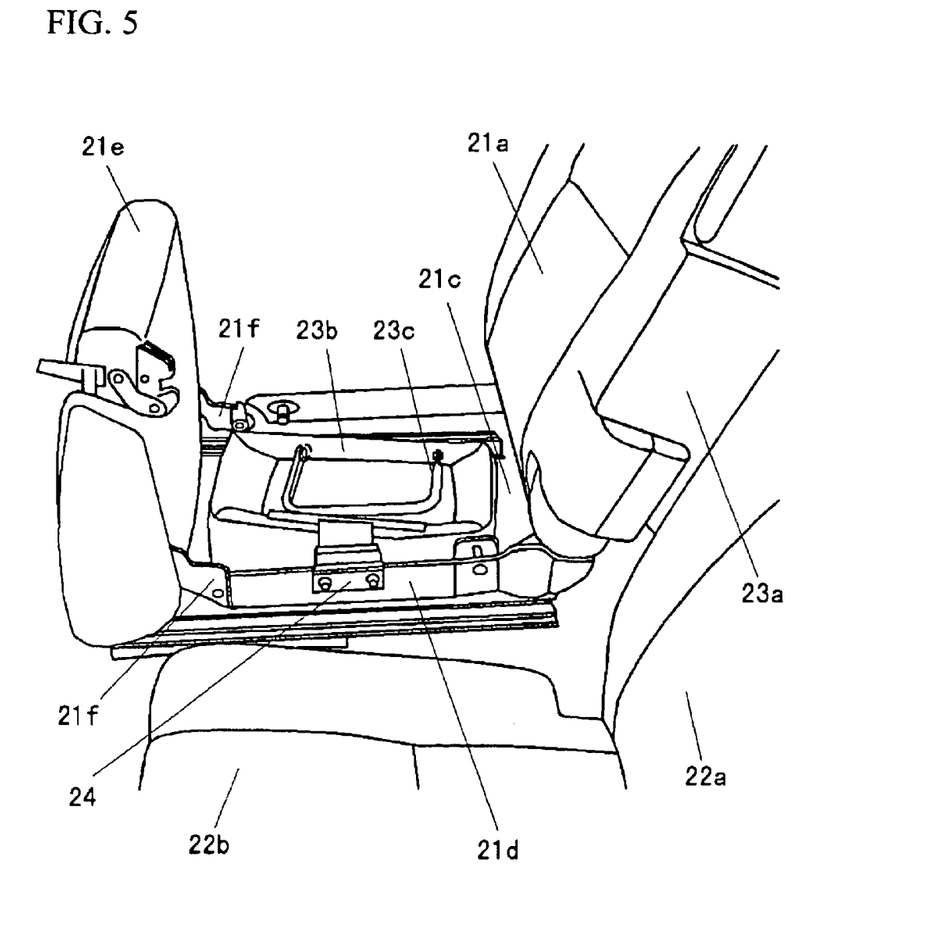
FIG. 5 is a perspective view of the second-row seat according to the first embodiment in which a supplementary seat cushion is stored in a storage recess, when viewed from the left side of the vehicle.
Figure 6:
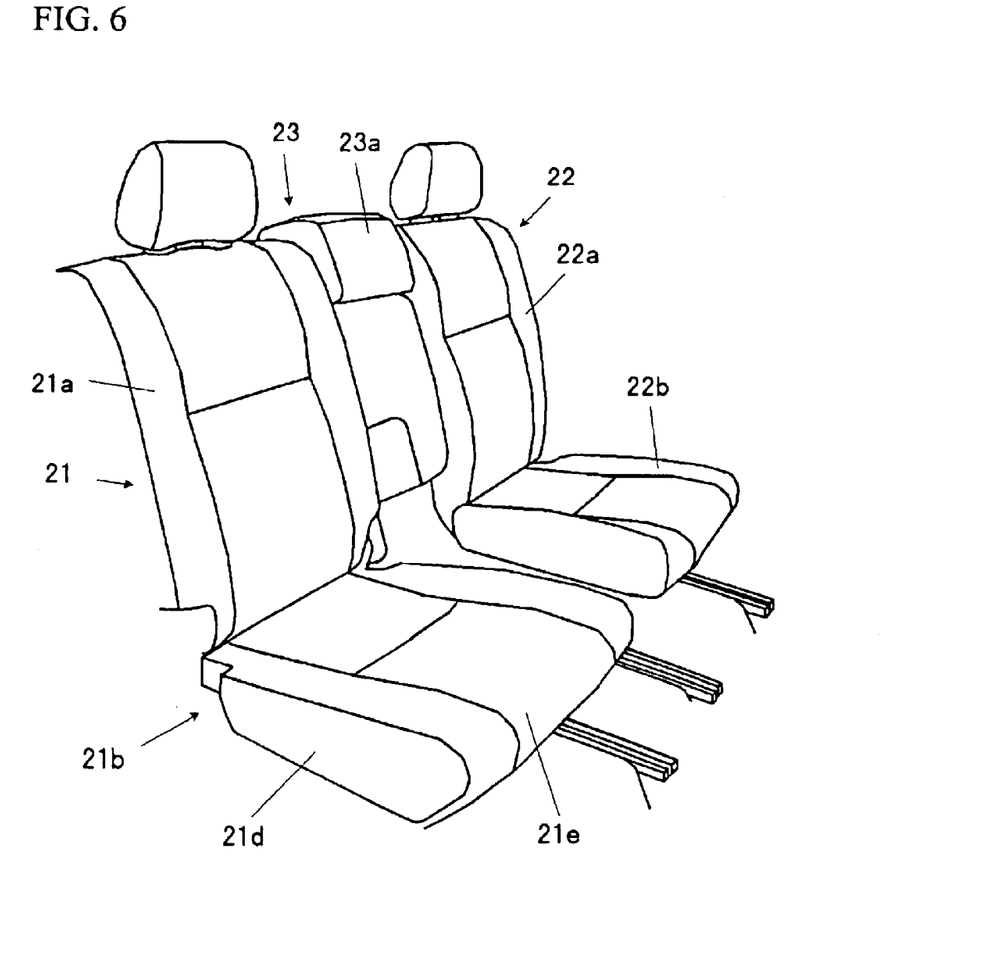
FIG. 6 is a perspective view of the second-row seat according to the first embodiment in which the supplementary seat cushion is stored in a storage recess and the cushion bottom portion is returned to a sitting position, when viewed from the right side of the vehicle.

FIG. 3 is a perspective view of the second-row seat 20, in which a rear end of the bottom portion 21e is rotated upward, when viewed from the right side of the vehicle. FIG. 4 is a perspective view of the second-row seat 20, in which the supplementary seat cushion 23b is stored in the storage recess 21c, when viewed from the right side of the vehicle. FIG. 5 is a perspective view of the second-row seat 20, in which the supplementary seat cushion 23b is stored in the storage recess 21c, when viewed from the left side of the vehicle. FIG. 6 is a perspective view of the second-row seat 20, in which the supplementary seat cushion 23b is stored in the storage recess 21c and the portion 21e is returned to a sitting position, when viewed from the right side of the vehicle.

With respect to the storage of the supplementary seat cushion 23b in the storage recess 21c, as shown in FIG. 3, at first the cushion bottom portion 21e is rotated about two supporting portions 21f, 21f (only right-side supporting portion 21f shown in FIG. 3), which are attached at the front and both sides of the cushion bottom portion 21e, with its rear end rising up, and thereby the storage recess 21c opens.

The supplementary seat cushion 23b is attached to a side wall of the cushion body portion 21d through an attaching member 24, which is swingable in the width direction vehicle so as to enable the supplementary seat cushion 23b to selectively take a sitting position, where the supplementary seat cushion 23b is located at the side of the seat cushion 21b of the right-side second seat 21 and thereby a passenger is able to sit on it, and a stored position, where the supplementary seat cushion 23b is stored in the storage recess 21c. (The attaching member 24 constitutes a swing mechanism.)

Herein, a reference numeral 23c denotes a foldable leg disposed at a bottom face of the supplementary seat cushion 23b. The leg 23c is placed on a vehicle floor, shown in FIG. 3, to support a load of a sitting passenger in the event of use of the supplementary seat 23. Meanwhile, it can be folded over the bottom face of the supplementary seat cushion 23b in the event of non-use of the supplementary seat 23.

Next, as shown in FIG. 4, the supplementary seat cushion 23b is swung toward the right-side second seat 21 from its position shown in FIG. 3 and stored in the storage recess 21c, and then the leg 23c is folded as shown in FIG. 5.

Then, as shown in FIG. 6, the cushion bottom portion 21e is rotated downward with its rear end going down from its position shown in FIG. 5, and thereby the storage recess 21c closes.

As described above, when the supplementary seat 23 is not used, the supplementary seat cushion 23b can be stored in the storage recess 21c.

Next, a structure and an usage mode change of the supplementary seat back 23e will be described referring to FIGS. 7 through 9.

Figure 7:
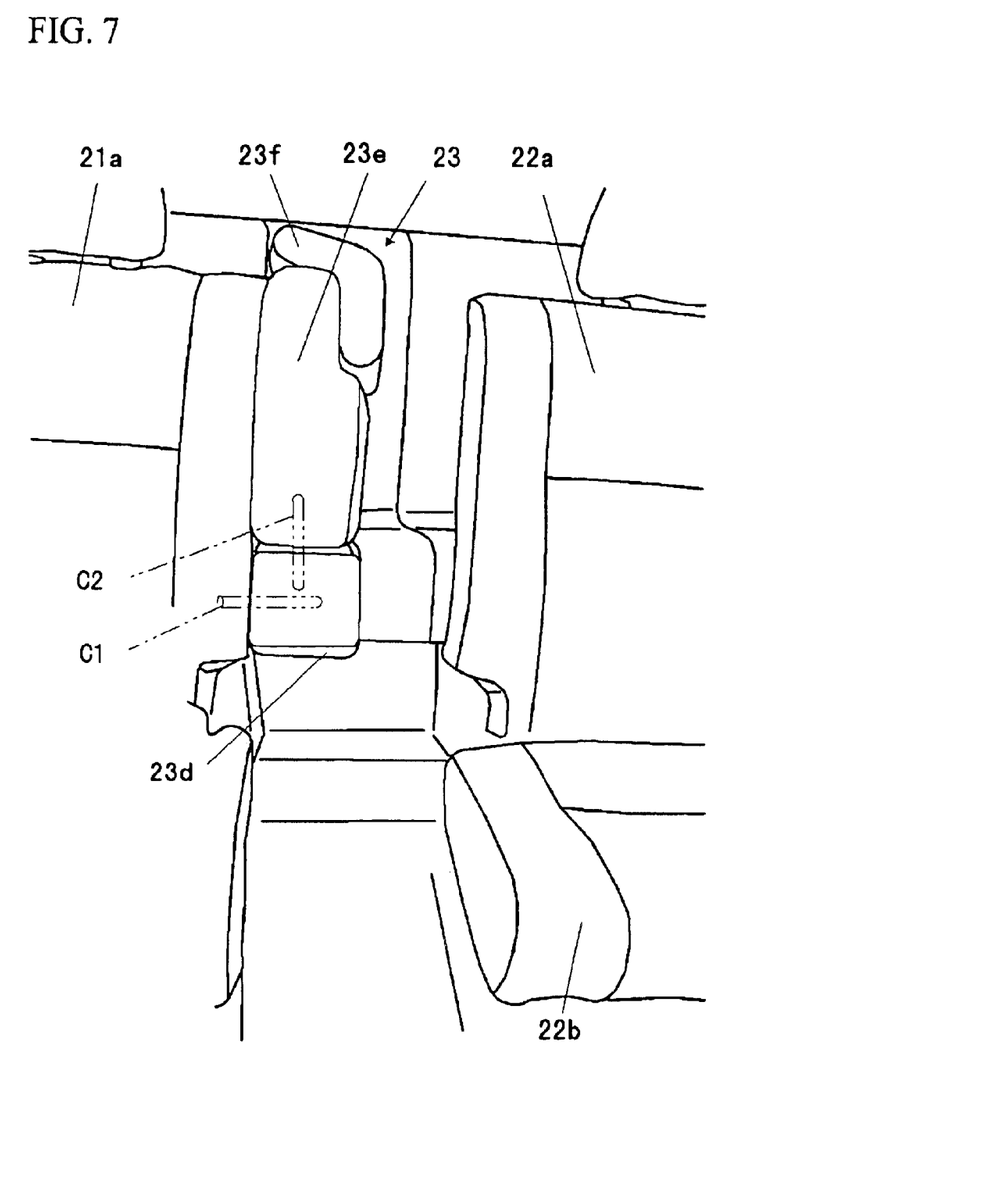
FIG. 7 is an elevation view of the second-row seat according to the first embodiment in which the supplementary seat takes a walk-through mode, when viewed from the front side of the vehicle.
Figure 8:
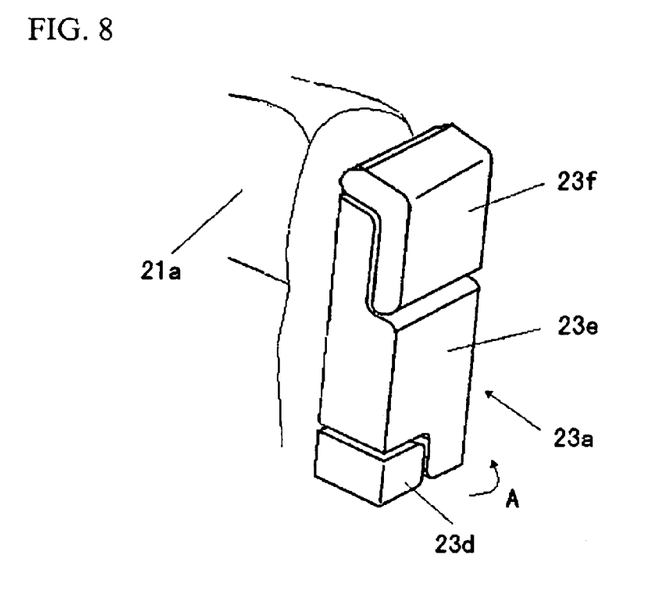
FIG. 8 is a perspective view of the supplementary seat back according to the first embodiment in which the supplementary seat takes a walk-through mode, when viewed from the left side of the vehicle.

FIG. 7 is an elevation view of the second-row seat 20, when viewed from the front side of the vehicle, in which the supplementary seat back 23a is located among the firs-row seat 10 through the third-row seat 30 to take a walk-through mode. FIG. 8 is a perspective view of the supplementary seat back 23a in which the supplementary seat back 23a is located among the first-row seat 10 through the third-row seat 30 to take a walk-through mode, when viewed from the left side of the vehicle. FIG. 9 is a perspective view of the supplementary seat back 23a in which the supplementary seat back 23a takes an armrest mode, when viewed from the left side of the vehicle.

The supplementary seat back 23a is comprised of a first seat back portion 23d, which is pivotally supported on a lower-side portion of the seat back 21a of the right-side second seat 21 through a rotational axis C1 shown in a broken line so as to rotate in the longitudinal direction of the vehicle, and a second seat back portion 23e and a third seat back portion 23f, which are located above the first seat back portion 23d and pivotally supported on an upper surface of the first seat back portion 23d through a rotational axis C2 shown in a broken line so as to rotate in the width direction of the vehicle.

Herein, the third seat back portion 23f functions as a headrest.

Next, the mode of the supplementary seat back 23a will be described.

The supplementary seat back 23a is configured so as to change its mode among three modes, i.e., use mode, walk-trough mode and armrest mode.

First, the use mode will be described.

The use mode is a mode in which the supplementary seat back 23a is used as a seat back. In this case, the supplementary seat back 23a is, as shown in FIGS. 2 through 6, disposed between the seat back 21a of the right-side second seat 21 with substantially no space between them, and the seat back 22a of the left-side second seat 22 functions as a seat back.

Next, the walk-through mode will be described.

The walk-through mode is a mode in which the second and third seat back portions 23e, 23f are folded in the width direction of the vehicle and thereby a space for allowing passengers to walk through between the second-row seat and the third-row seat is formed between the seat back 21a of the right-side second seat 21 and the seat back 22a of the left-side second seat 22. As shown in FIGS. 7 and 8, the second and third seat back portions 23e, 23f are rotated rearward i.e., in an arrow A direction of FIG. 8 (first rotational position), and thereby side faces of the second and third seat back portions 23e, 23f at the side of the left-side second seat 22 are located rearward, and side faces thereof at the side of the right-side second seat 21 are located forward. As a result, there is provide the space between the seat back 21a of the right-side second seat 21 and the seat back 22a of the left-side second seat 22, which enables passengers to walk through.

Finally, the armrest mode will be described.

The armrest mode is a mode in which the supplementary seat back 23a is used as an armrest when the supplementary seat 23 is not used as a seat. The supplementary seat back 23a is rotated forward, i.e., in an arrow B direction of FIG. 9, from the position shown in FIG. 8 to the substantially horizontal position (second rotational position). As a result, the side face of the supplementary seat back 23a at the side of the left-side second seat 22 is located so as to face substantially upward, and thus this side face can be used as a rest surface of the armrest.

Figure 10:
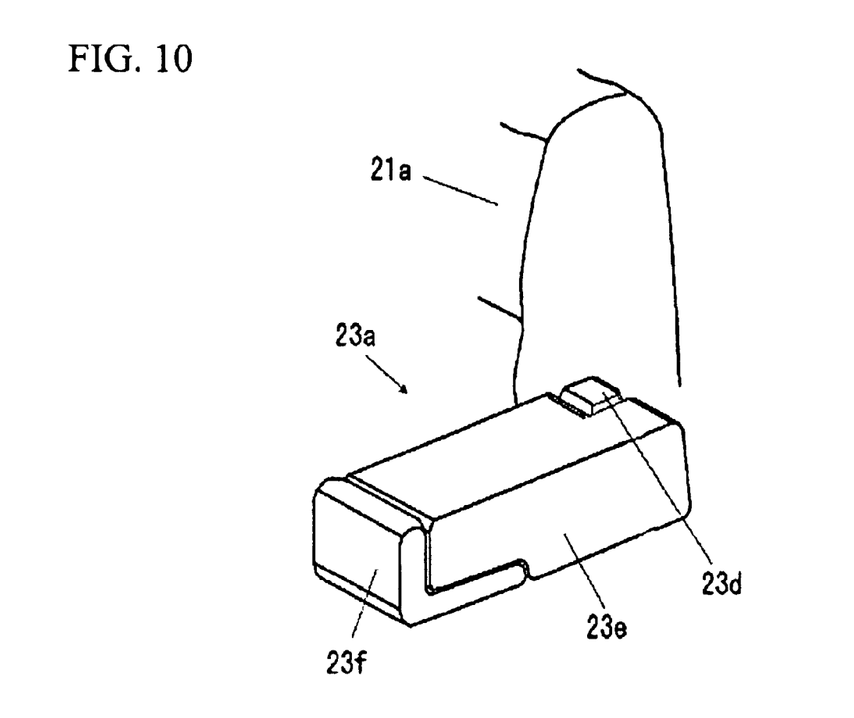
FIG. 10 is a perspective view of a supplementary seat back according to another embodiment of the present invention in which the supplementary seat back takes an armrest mode, when viewed from the left side of the vehicle.

Herein, the armrest mode may be constituted, as shown in FIG. 10, by simply rotating the supplementary seat back 23a forward from its use-mode position, without by way of its walk-through-mode position. In this case, a back face of the supplementary seat back 23a is located to face substantially upward, and the back face will be used as the rest surface of the armrest.

Figure 9:
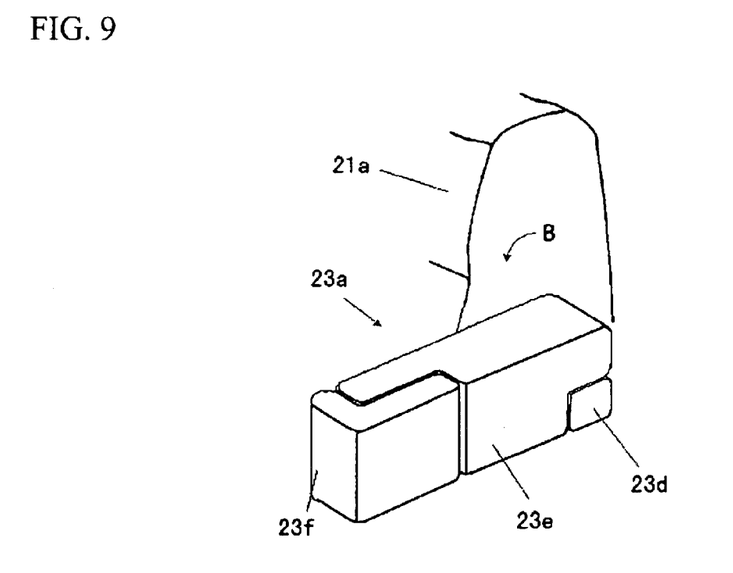
FIG. 9 is a perspective view of the supplementary seat back according to the first embodiment in which the supplementary seat takes an armrest mode, when viewed from the left side of the vehicle.

However, in this case shown in FIG. 10, the position of the face of the supplementary seat back 23a which is used as the rest surface of the armrest may be lower than that of the case shown in FIG. 9. (Because generally the supplementary seat back is configured in a shape that its width is longer that its thickness.)

As described above, according to the present embodiment, since the supplementary seat cushion 23b and the supplementary seat back 23a are formed separately from each other and only the supplementary seat cushion 23b is stored in the storage recess 21c, the depth (height) of the storage recess 21c can be decreased as much as possible. As a result, this can suppress the deterioration of comfortable ride caused by the high-sitting point arrangement of the right-side second seat 21 storing the supplementary seat 23.

Further, since the supplementary seat back 23a is configured such that its upper end portion is detachably supported and its lower end portion is pivotally supported so as to allow the supplementary seat back 23a to rotate in the longitudinal direction of the vehicle, it can be used as a table or an armrest. As a result, this can improve utility of the seat device without providing additional members.

Further, since the seat cushion 21b includes the attaching member 24 to support pivotally the supplementary seat cushion 23b in the width direction of the vehicle, this seat device can store easily the supplementary seat cushion 23b in the storage recess 21c of the right-side second seat 21.

Further, there is provided the rotational mechanism (pivot axes C1, C2) for rotating the supplementary seat back 23a to allow it to take the first rotational position, where it is rotated in the width direction of the vehicle and its back face faces substantially toward the width direction of the vehicle, and the second rotational position, where it is rotated forward from the first rotational position and its side face faces substantially upward. Accordingly, in the event that the supplementary seat back 23 is not used as the seat, the supplementary seat back 23a is rotated in the width direction of the vehicle and then forward. Thereby, this can locate the side face of the supplementary seat back 23a at a higher position. As a result, the supplementary seat back 23a can be used as an armrest appropriately, thereby improving the utility of the seat device.

Further, a simple operation that only the supplementary seat cushion 23b is stored in the storage recess 21c and the supplementary seat back 23a is rotated in the width direction of the vehicle to be folded can provide the walk-through space disposed between the two second seats 21, 22 easily.

Although the supplementary seat 23 is disposed between the right-side second seat 21 and the left-side second seat 22 in the present embodiment, the third-row seat 30 may be composed of two separate seats instead of a bench type of seat and the supplementary seat 23 may be disposed between them.

Further, the supplementary seat 23 may be disposed beside either the right-side seat 21 or the left-side second seat 22 and at a door's side, not being disposed between the seats like the present embodiment.

Also, although in the present embodiment the supplementary seat cushion 23b of the supplementary seat 23 is pivotally attached to the side portion of the seat cushion 21b of the right-side second seat 21 so as to swing, it may be attached to a vehicle floor.

Any other additional modification may be applied within the scope of the present invention.

What is claimed is:

1. A seat device for a vehicle, comprising:

a seat including a seat cushion and a seat back;

a supplementary seat disposed at a side of said seat, wherein said seat cushion of the seat comprises a cushion body portion that includes a storage recess with an upward opening and a cushion bottom portion that covers the opening of the storage recess so as to selectively open or close the opening, said supplementary seat comprises a supplementary seat back whose upper end portion is detachably supported on a side portion of said seat and lower end portion is pivotally supported on the side portion of said seat so as to allow the supplementary seat back to rotate in a longitudinal direction of the vehicle, and a supplementary seat cushion which is formed separately from the supplementary seat back and disposed below the supplementary seat back and at a side of said seat cushion of the seat, and said supplementary seat cushion of the supplementary seat is configured so as to selectively take a sitting position, where the supplementary seat cushion is located at the side of the seat cushion of said seat, and a stored position, where the supplementary seat cushion is stored in the storage recess of the seat cushion body portion of said seat.

2. The seat device for a vehicle of claim 1, wherein said seat cushion of the seat includes a swing mechanism for pivoting said supplementary seat cushion of the supplementary seat so as to allow the supplementary seat cushion to swing substantially in a width direction of the vehicle.

3. The seat device of a vehicle for claim 1, wherein said supplementary seat back of the supplementary seat includes a rotational mechanism for rotating the supplementary seat back from its sitting position to allow the supplementary seat back to take at least a first rotational position, where the supplementary seat back is rotated in a width direction of the vehicle and a back face of the supplementary seat back faces substantially toward the width direction of the vehicle, and a second rotational position, where the supplementary seat back is rotated forward from the first rotational position and a side face of the supplementary seat back faces substantially upward.

4. The seat device for a vehicle of claim 1, wherein said seat includes two seats disposed separately in a width direction of the vehicle, said supplementary seat is disposed between the two seats, and said supplementary seat back of the supplementary seat includes a rotational mechanism for rotating the supplementary seat back from its sitting position to allow the supplementary seat back to take at least a position where the supplementary seat back is rotated in a width direction of the vehicle and a back face of the supplementary seat back faces substantially toward the width direction of the vehicle.

5. A seat device for a vehicle, comprising:
   a row of seats including two seats that are disposed separately in a width direction of the vehicle and include each seat cushion and seat back, the seat cushion of at least one of the seats comprising a cushion body portion that includes a storage recess with an upward opening and a cushion bottom portion that covers the opening of the storage recess so as to selectively open or close the opening;
   a supplementary seat disposed between said two seats and including a supplementary seat back and a supplementary seat cushion that are formed separately from each other, an upper end portion of the supplementary seat back being detachably supported on a side portion of the seat back of said one of the seats and a lower end portion thereof being pivotally supported on the side portion of the seat back of said one of the seats so as to allow the supplementary seat back to rotate in a longitudinal direction of the vehicle, the supplementary seat cushion disposed below the supplementary seat back and at a side of the seat cushion of said one of the seats; and
   a swing mechanism for pivoting said supplementary seat cushion of the supplementary seat so as to allow the supplementary seat cushion to swing substantially in the width direction of the vehicle, the swing mechanism allowing said supplementary seat cushion of the supplementary seat to selectively take a sitting position, where the supplementary seat cushion is located at the side of the seat cushion of said one of the seats, and a stored position, where the supplementary seat cushion is stored in the storage recess of the seat cushion body portion of said one of the seats.

6. The seat device for a vehicle of claim 5, further comprising a rotational mechanism for pivotally supporting and rotating said supplementary seat back of the supplementary seat, the rotational mechanism allowing the supplementary seat back to take at least a first rotational position, where the supplementary seat back is rotated in a width direction of the vehicle and a back face of the supplementary seat back faces substantially toward the width direction of the vehicle, and a second rotational position, where the supplementary seat back is rotated forward from the first rotational position and a side face of the supplementary seat back faces substantially upward.

7. The seat device for a vehicle of claim 6, wherein said supplementary seat cushion and said supplementary seat back are respectively changed in their positions by said swing mechanism and said rotational mechanism such that the seat device provides at least a use mode where the supplementary seat functions as a seat, a walk-through mode where the supplementary seat cushion is stored in said storage recess and the supplementary seat back takes said first rotational position, and an armrest mode where at least the supplementary seat back takes said second rotational position.

* * * * *